July 24, 1934.   E. O. COREY   1,967,497
LOCOMOTIVE LUBRICATION SYSTEM
Filed March 26, 1931   8 Sheets-Sheet 1

Inventor
Elmer O. Corey
By Wood & Wood
Attorneys

July 24, 1934.  E. O. COREY  1,967,497
LOCOMOTIVE LUBRICATION SYSTEM
Filed March 26, 1931  8 Sheets-Sheet 2
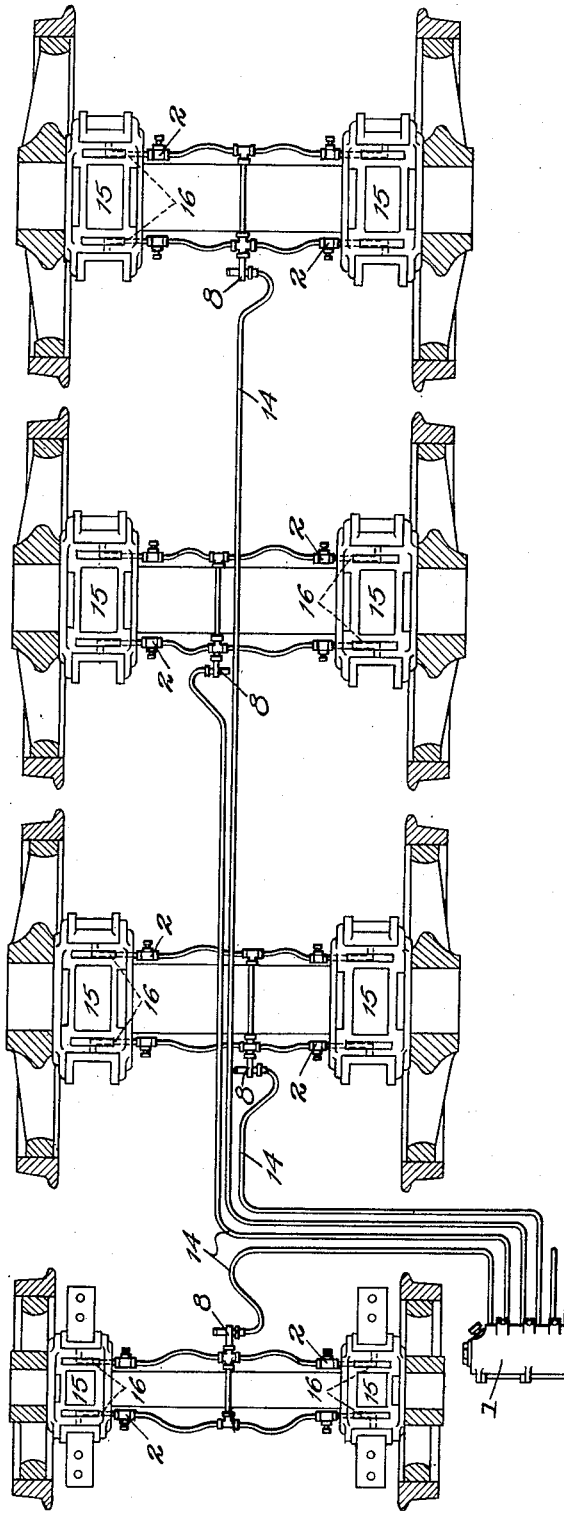
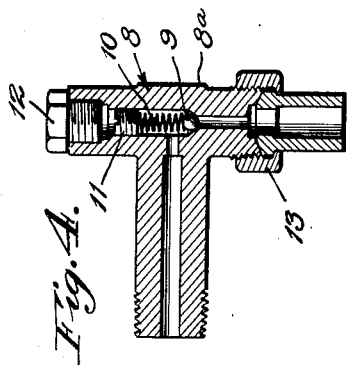
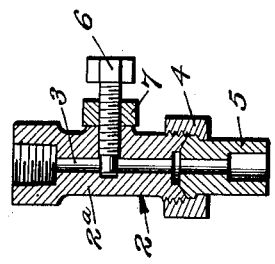
INVENTOR
Elmer O. Corey
BY
Wood & Wood
ATTORNEYS

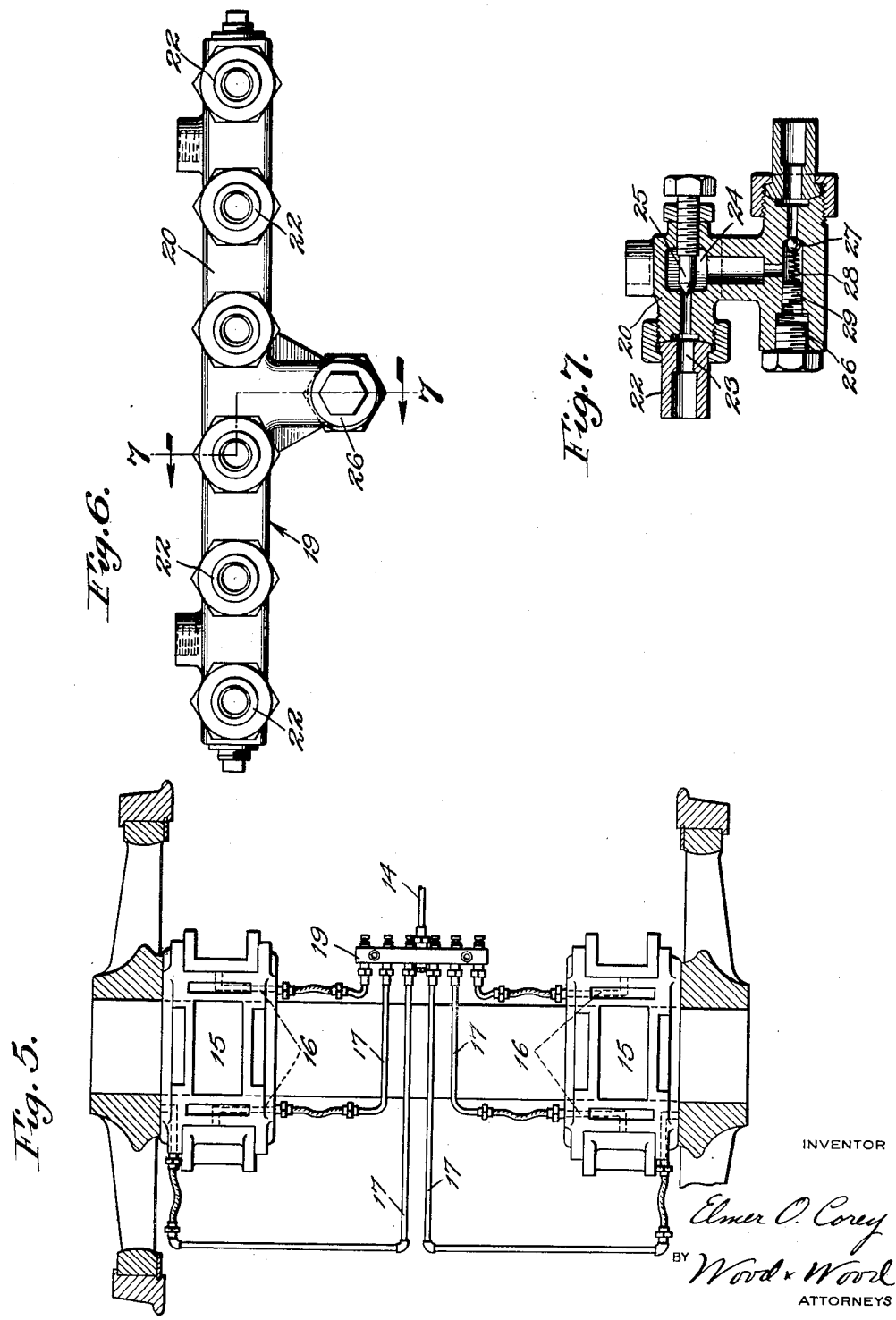

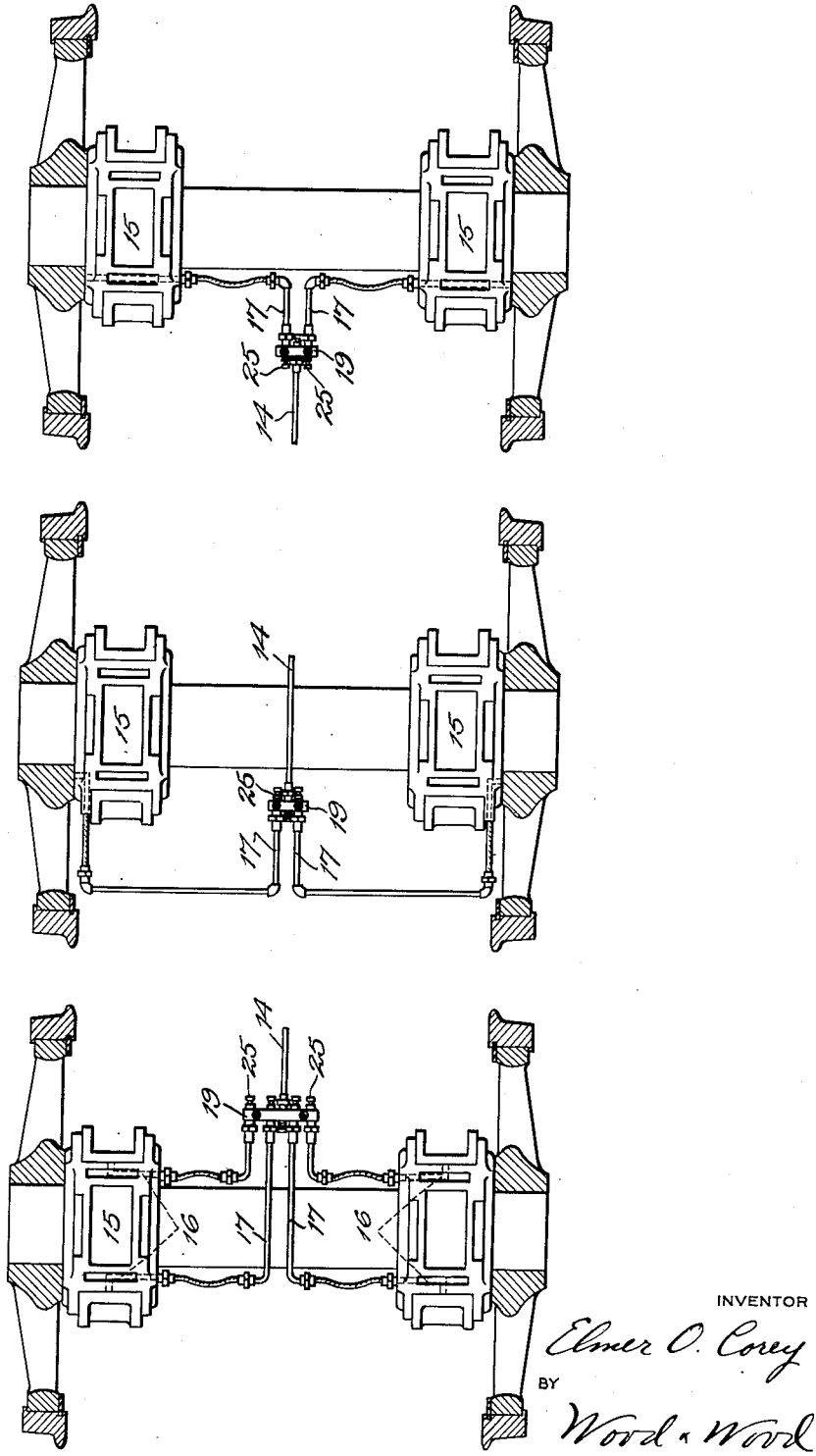

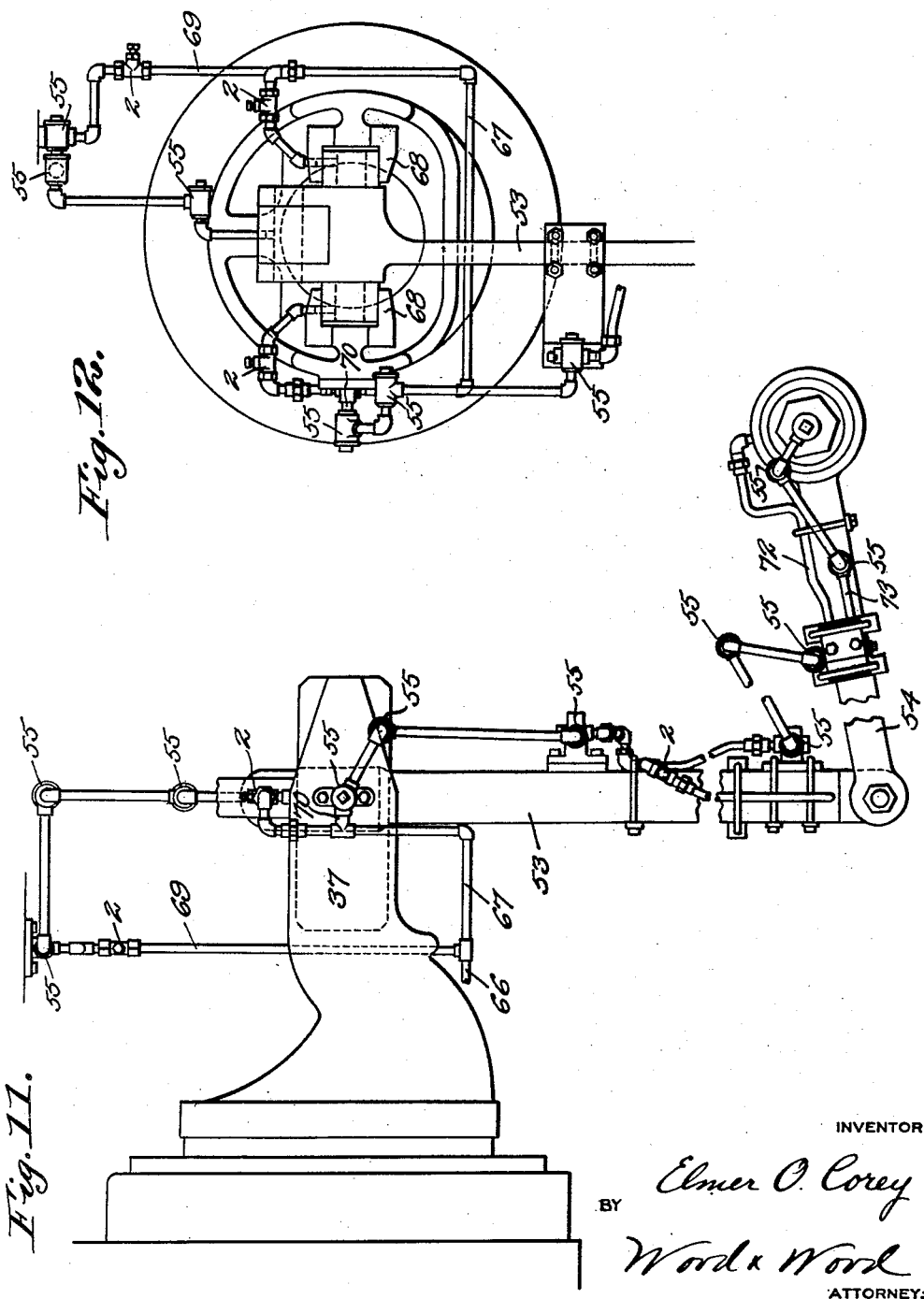

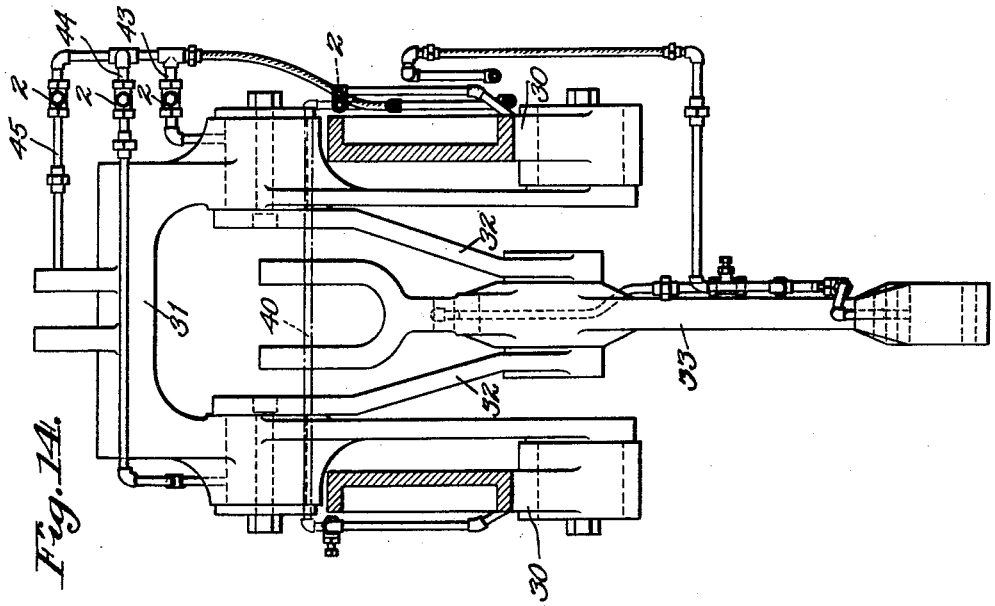
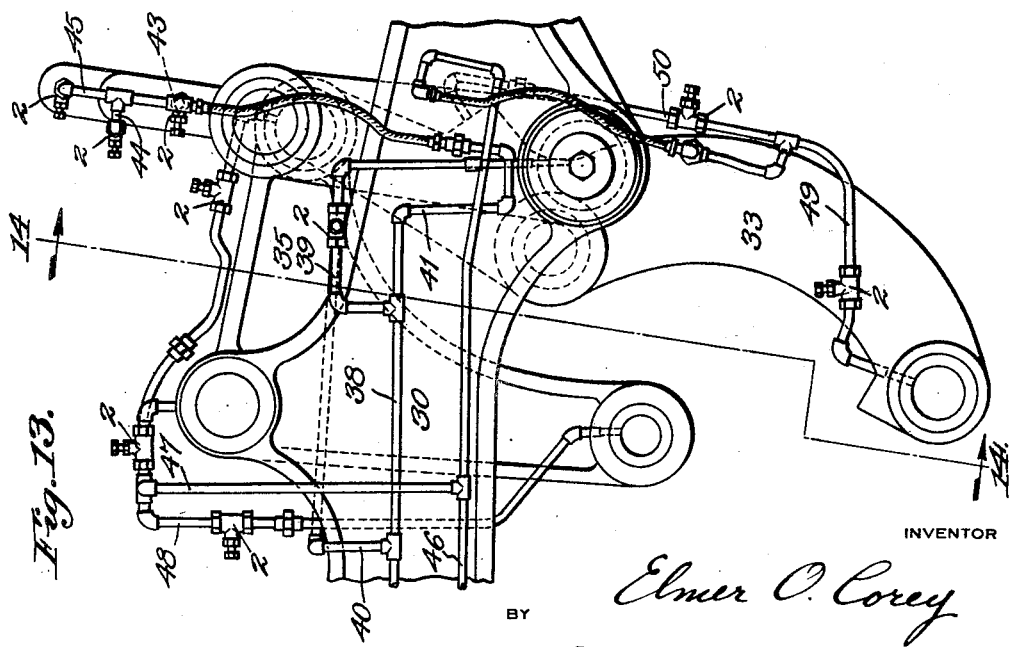

July 24, 1934.  E. O. COREY  1,967,497
LOCOMOTIVE LUBRICATION SYSTEM
Filed March 26, 1931   8 Sheets-Sheet 7
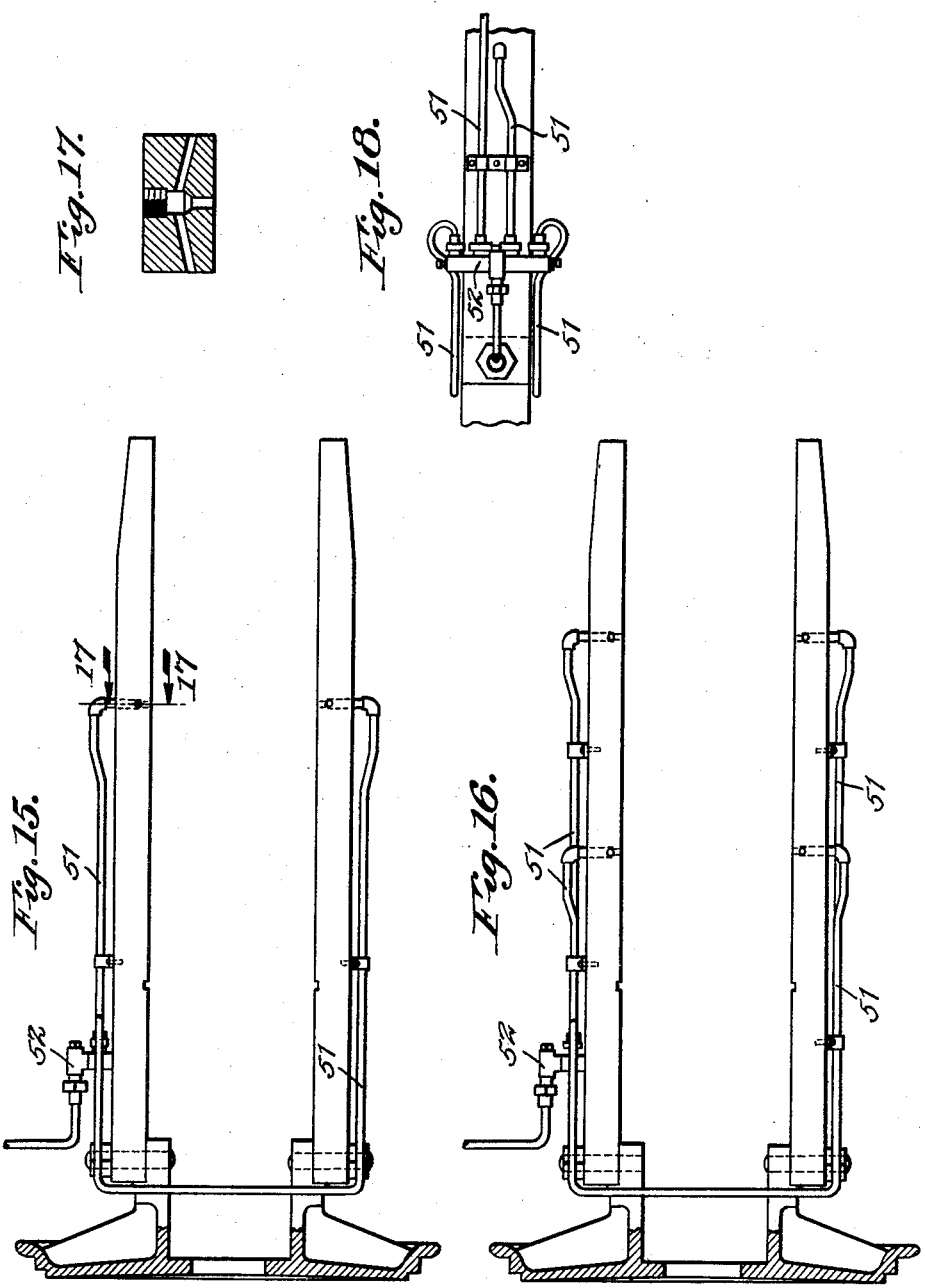
INVENTOR
Elmer O. Corey
BY
Wood & Wood
ATTORNEYS

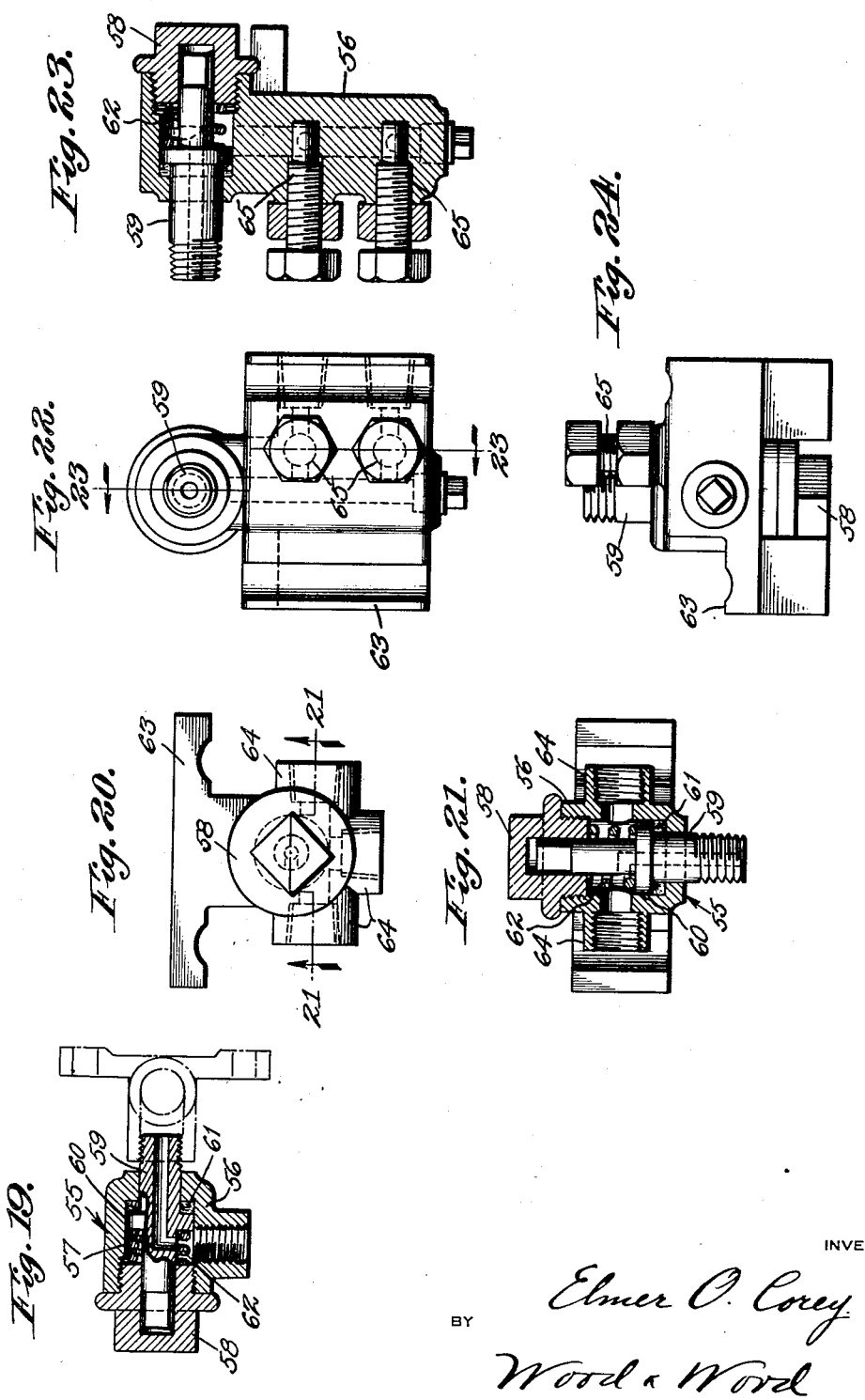

Patented July 24, 1934

1,967,497

UNITED STATES PATENT OFFICE 1,967,497

LOCOMOTIVE LUBRICATION SYSTEM

Elmer O. Corey, Norwood, Ohio, assignor to The Edna Brass Manufacturing Company, Cincinnati, Ohio, a corporation of Ohio Application March 26, 1931, Serial No. 525,468

3 Claims. (Cl. 184—6)

This invention relates to a centralized distribution lubricating system for constantly supplying lubricant, while the parts are in motion, at high or determined pressures and in measured amounts to numerous parts, either moving or stationary, to meet the requirements of the parts. The system is primarily applicable to locomotives and to which reference particularly is made, although its use in connection with other machinery is contemplated.

For locomotive use, on account of the difficulty and necessity of securely mounting the lubricant distributing pipe lines due to the severe vibration to which they are subjected and to avoid complexity in the system, it is preferable to have as small a number as possible, of main feed lines leading from the lubricator and to use one standard size of piping and fittings for each distributor unit for convenience in installation and maintenance. Each main feed line or distributor unit is equipped with as many branch lines, and the branches with sub-branch extensions as the capacity of the main line will serve to distribute the necessary amount of oil to the various bearings connected in a unit of distribution. When the main lines leading from the lubricator are long, a terminal check valve is installed therein, to prevent the line from being drained each time a branch or subbranch is broken or disconnected in making repairs or otherwise and to always insure a fully charged unit immediately upon the engine starting in motion. For those bearings or points requiring a metered or reduced quantity of lubricant, a regulating valve is interposed in the line preferably near the outlet or point to be lubricated so that the outlet is governed for a determined discharge. The feed control, however, is not entirely dependent on the regulating valves for the various outlets, as the supply can be governed and regulated by adjustments made at the lubricator by increasing or decreasing the discharge.

The lubricator is preferably of a force feed type as shown and described in a pending application filed by me on August 28, 1928, Serial No. 303,504 having a plurality of feed outlets, each outlet having its own forcer plunger or pump. The lubricator is also equipped for handling several kinds or grades of lubricant.

When heavy lubricant is used, all the points that such kind of lubricant will answer, are in direct line connection under high pressure from the lubricator. High pressure lubrication can be carried from the lubricator to any point or points, as for lubricating the valve stem cross head, guides, combination lever, valve gearing, hubs, shoes, etc. From stationary to movable parts and from one movable part to a second, and when lubricating moving parts, the feed line is run to a stationary point nearest the moving oiling point and from such stationary point through a flexible conductor, or a rigid conductor with a flexible joint interposed therein, and with a flexible joint of the preferred type herein embodied, to the movable part.

Wherever the branch line permits, it is desirable to extend the main line to a manifold at a central location, with the branch lines leading out from the manifold. A preferred embodiment of manifold is herein described combining an independent regulating valve for each manifold outlet.

The system primarily contemplates the control of all outlets to insure that the proper quantity of lubricant will be delivered, no matter what conditions may be encountered by change of temperature, as when cold a high pressure may be required, and the pressure automatically applied by the lubricator without any adjustments or change in regulation at the outlets.

An object of the invention is to provide a centralized lubricating system or unit, or a plurality of units from a single lubricator or source of supply, each unit automatically metering oil in exactly the correct amount to the various bearings, as the locomotive runs, eliminating hand lubrication and service, and assures perfect lubrication to all points without any attention of an attendant.

Another object of the invention is to provide a centralized lubricating system or unit, comprising a main pipe line leading from a lubricator and branch line extensions to the various points or bearings, with a regulating valve for each point or outlet, to deliver a metered amount of oil to each point or bearing and adapted for the utilization of a single standard size of pipe for all the lines of the system or unit.

Another object of the invention is to provide a centralized system of lubrication for lubricating various bearings in metered quantities, through a main feed line to a manifold, centrally located and from the manifold by branch lines to the various bearings, with a regulation for each branch at the manifold.

Other features and advantages of the invention are more fully set forth in the description of the accompanying drawings forming a part of this specification, in which:

Figure 2 is a horizontal section through the running gear of a locomotive, illustrating the lubricating method or unit as applied for lubricating the shoes and wedges.

Figure 3 is an enlarged central section of a regulating valve used for each outlet or branch to individualize regulation for the various points to which a distributing line is directed.

Figure 4 is an enlarged central section of a terminal check valve employed in the system.

Figure 5 is a horizontal section of a pair of wheels of a locomotive running gear with journals and axles in elevation illustrating the distributing or branch lines leading from a manifold for lubricating the hubs, shoes and wedges.

Figure 6 is an enlarged side elevation of a manifold for six branch lines.

Figure 7 is a section on line 7—7, Figure 6.

Figures 8, 9 and 10 are views similar to Figure 5, showing modified arrangements for lubricating shoes, wedges or hubs.

Figure 11 is a detailed side elevation of a valve stem guide, combination lever, mounted upon guide and union link connecting combination lever with cross head.

Figure 12 is an end elevation of the valve stem guide showing the arrangement for lubricating the guides and upper end of combination lever.

Figure 13 is a fragmentary side elevation of a portion of a valve gear, including radius bar, yoke and bell crank lever and the pipe lines for lubricating the various bearings, applicable to either "Baker", "Young", "Walschart", or "Southern" types of valve gears.

Figure 14 is a section on line 14—14, Figure 13.

Figures 15 and 16 are views of cross head guides, one illustrating a two point and the other a four point distribution.

Figure 17 is a section on line 17—17, Figure 15.

Figure 18 is a detailed top plan view of a portion of the upper guide shown in Figure 16, illustrating a four outlet manifold fixed upon the guide.

Figure 19 is a vertical sectional view through a preferred type of conduit flexible joint or hinge used in extending a distributing line from a relatively stationary to the movable part.

Figure 20 is a front elevation of a combination flexible joint and manifold.

Figure 21 is a section on line 21—21, Figure 20.

Figure 22 is an elevation of a combination conduit flexible joint and manifold with a separate regulating valve for each outlet or branch.

Figure 23 is a section on line 23—23, Figure 22.

Figure 24 is an end view of the fitting shown in Figure 22.

Figure 1:
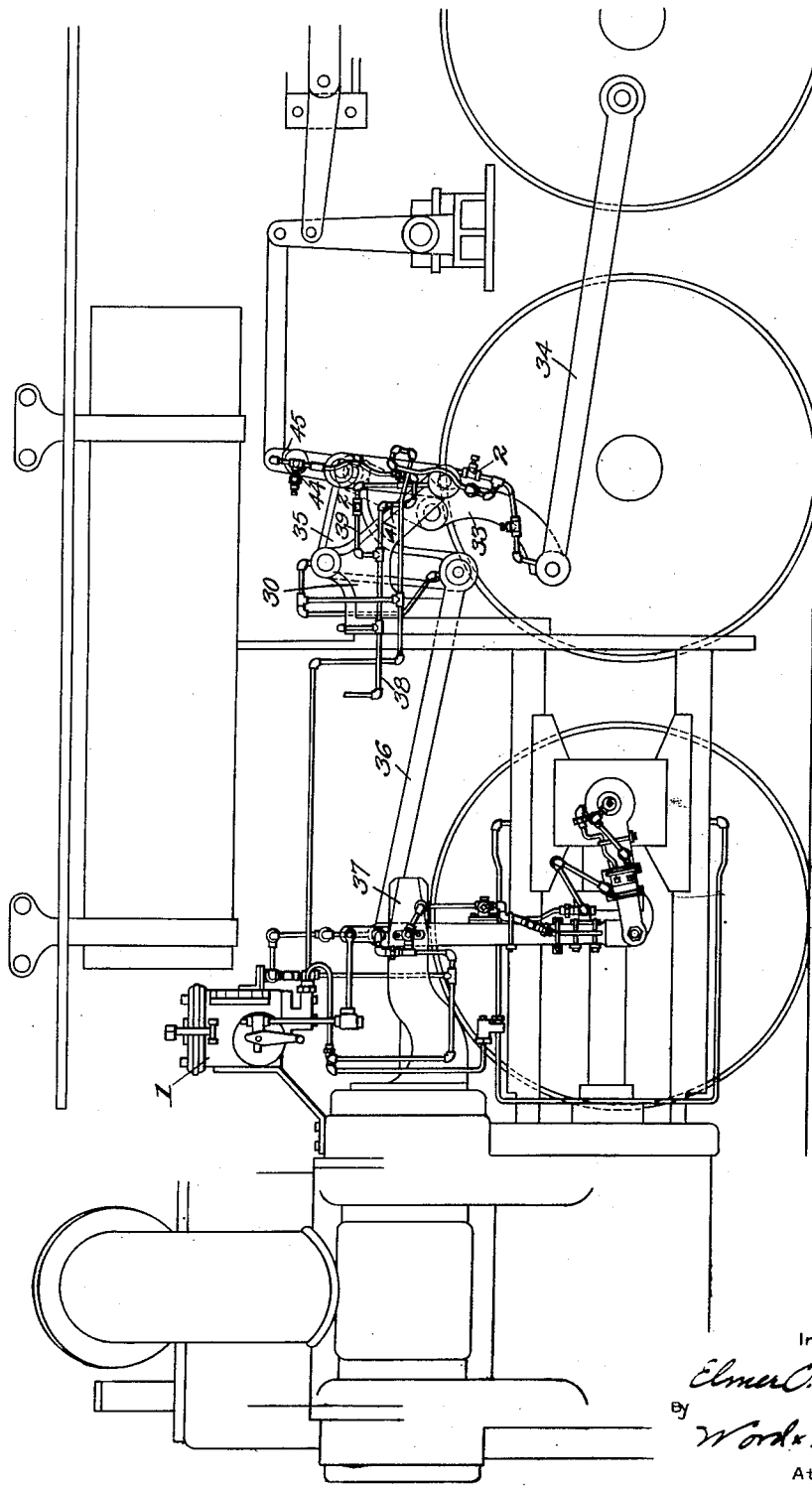
Figure 1 is a partial side elevation of a portion of a locomotive illustrating the system for lubricating the various bearings of a "Baker" type of valve gear and for the cross head and cross head guides at one side of the locomotive.

A lubricator 1 is of a type known as a multiforce feed in which each of the feeds has its own forcing apparatus of the nature of a plunger pump, each feed and its pump constituting a delivery unit independent of the others. All of the pumping units for the number of lubricators are mounted within and receive their supply from a reservoir or reservoirs and all operated from a shaft engaged through the reservoir. This shaft is operated by suitable mechanism connecting with an operating part of the locomotive as the driving gear so that the pumps are always in operation when the locomotive is in motion.

The feed outlets of the several forcer or pumping units are generally disposed in a longitudinal line or row from the base or lower side of the reservoir and all of the moving parts of each are immersed at all times in oil from the reservoir, therefore requiring no attention in so far as lubrication is concerned. The forcer or pumping units, each are provided with adjustments for increasing or decreasing the capacity thereof so that a required amount necessary for each feed line can be accurately obtained and maintained.

In Figures 2 to 10 inclusive, the lubricating system is illustrated as it applies to the running gear of a locomotive for lubricating the hubs of the wheels and the shoes and wedges of the boxes. In the arrangement shown, an individual feed line is employed from the lubricator to each pair of journals. This, however, is merely a preferred arrangement and a single feed line can be used for supplying the lubricating points of multiplicity of wheels or other points requiring lubrication.

Each outlet is provided with a regulating valve 2 preferably of a type of construction as shown in Figure 3, for controlling or regulating the amount of lubricant delivered. The regulating valve, comprising, a body $2^a$ having a central bore or passage 3 therethrough, the opposite longitudinal ends of the body formed for making pipe connections therewith, for instance, one end is internally threaded for making a pipe connection directly therewith, while the opposite end provides for a union coupling and is externally threaded to receive a coupling nut 4 with the face end of the body countersunk to serve as a seat for the head end of a coupling sleeve or tail-piece 5 locked to the body by the coupling nut 4. A regulating valve 6 is threaded into the body and the free end traversing the bore 3, the stem of the regulating valve being locked in its set position by a lock nut 7 engaged upon the threaded stem portion of the valve. The regulating valve thus provides at one end for making a permanent pipe connection, and at an opposite end for a removable connection or union, and the union sleeve or tail-piece 5 arranged to be either threaded or braked upon a pipe or fitting or directly tapped into a threaded bore in the part to be lubricated. For each main feed line, a terminal check valve 8 is provided toward or at the end of the line to withhold the supply in the line and keep the same fully charged at all times.

A preferred type of terminal check valve is illustrated in Figure 4, comprising a body $8^a$ with a right angled bore therethrough, a ball check valve 9 seated under the pressure of a spring 10, having one end engaging the ball and an opposite end bearing against an adjusting screw 11 screw-threaded within the body and housed by a cap screw 12 screw-threaded into an end of the body. The inlet and outlet ends of the valve, as in the case of the regulating valve, at one end is provided with a union coupling 13 as the inlet end and the outlet end formed for making a permanent connection thereto.

Referring to Figure 2 disclosing a plurality of feed lines 14 leading from the force feed lubricator 1, each for delivering lubricant to a number of branch lines for lubricating selected points of a pair of wheel journals, as shoe and wedge. In said figure four parts or sets of wheel journals are shown, each pair having its own feed line from the lubricator. This may be diversified as for instance in Figure 5, a single feed line serves six branches for lubricating the journals and hubs of a pair of wheels.

Each journal box 15 toward the top of its inner side is drilled to provide a pair of horizontal angle passages 16—16 respectively having outlets in the central portion of the shoe slideways at opposite ends of the box. The inlet end of each passage or bore is tapped for making a permanent piping connection therewith, of a branch line 17 which in turn connects with the feed line 14, each branch line 17 having a regulating valve 2 incorporated or interposed therein and while not necessary to couple the regulating valve direct to the box, the piping for making the connection between the valve and the bore or passage 16 should be as short as possible in order to have the regulating valve near the outlet.

A terminal check valve 8 is incorporated or interposed between the head end of the branches and the main feed line 14. In each branch line a length of flexible tubing or a flexible joint is interposed to allow full movement of the box or moving part without any pull on the flexible pipe or pipe joint. A preferred form of mechanical flexible joint will be hereinafter disclosed and is used in place of flexible tubing, wherever the line is subjected to or has severe vibration or high internal pressures to avoid leakage. The piping is secured with clamps or welding in order that it may be held in place as rigidly as possible.

In Figure 5 a combination of six branch lines is shown for lubrication of hubs and shoes of a pair of wheels and boxes all connecting to a single manifold 19, the manifold incorporating an independent regulating valve for each branch of the unit. Figure 8 shows a four branch line combined manifold, check and regulating valve for lubricating control and distribution to four points, as the shoes of the pair of boxes, and Figures 9 and 10, two branch line manifolds, with check and regulating valves showing relative modifications for conducting the lubricant through the journal boxes to distribute the lubricant to the wheel hubs.

Connection for hub oiling is made toward the bottom of the box so that the oil will be carried up and over the entire hub face of the box. The combined manifold, check and regulating valve for any number of branch lines are the duplicates of each other except for the number of branch outlets and regulating valves and its employment produces compactness, reduces the number of individual fittings, and materially simplifies installation.

Each manifold, comprises, a tubular body 20 (see Figures 6 and 7) possessed of the desired number of outlet nipples 22, extending from one side thereof, each nipple externally threaded for receiving a coupling nut to make a branch pipe line connection therewith and has a passage or bore 23 therethrough, communicating with a supply passage 24 in the body and valve controlled by a regulating valve 25 screw-threaded in the body, cooperating with bore or passage 23 to close or control the inlet end thereof. Each outlet or branch of the series is therefore independently controlled or regulated with the regulating valves aligned in a row along the front or one side of the body. The body is provided with a T extension 26 with one end thereof formed to receive a union nut for making a pipe connection therewith, as the main feed line for serving the manifold with the inlet end of said T extension check valve controlled by a ball check valve 27 held to its seat by a spring 28 engaged against an adjusting screw 29 screw-threaded within the head portion of said T extension.

It is recognized that there are several different types of valve gears employed in locomotive design and therefore, the piping for the various valve gears must be modified one over the other to meet the different conditions encountered.

In Figures 1, 13 and 14, a "Baker" type of valve gear is illustrated and the piping arrangement for lubrication of the various bearings will, to a degree, serve for "Young", "Walschart", and "Southern" types of valve gears.

The numeral 30 indicates a pair of stationary side frames suitably spaced apart for supporting various elements of the valve gear therebetween, as a radius bar 31 of yoke form, having a pair of limbs, each provided with a trunnion journalled in a bearing of a respective stationary frame 30. The radius bar pivotally carries a shackle 32 and disposed between the yoke limbs thereof. The shackle pivotally supports a lever 33 therebetween, one end of the lever 33 pivotally connecting with a connecting link 34 and the opposite or upper end of the lever is of yoke form or bifurcated to pivotally connect with a limb of a bell crank lever 35. The bell crank lever 35 is pivotally mounted upon stationary bars of the side frames and the second or lower limb of the bell crank lever 35 pivotally connects with one end of a connecting link 36 which in turn extends forwardly to the valve stem guide 37.

Two lines of piping for two distributing units are extended from the lubricator 1 to the valve gear for lubricating the various bearings of the radius bar 31, shackle 32, lever 33, and bell crank 35, comprising, a main feed line or pipe 38 leading from the lubricator and extending along one of the side frames 30 and rigidly secured thereto by cleats and other fastener devices. The main line 38 has several branch lines extending therefrom as a branch line 39 with a regulating valve 2 interposed therein, the branch line extending to connect its outlet with a suitable bore or passage in the bearing for one of the trunnions of the radius bar 31. A second branch 40 connects with the main line 38, and extends across the stationary frames to reach the bearing for the opposite trunnion of the radius bar. This branch line 40 is also equipped with a regulating valve 2. A third branch line 41 connects with the main line 38 at a suitable point from the stationary frame to the upper end of the swinging radius bar, the branch line extending from a stationary part to a movable part, having a section of flexible tubing 42 interposed therein or the flexible tubing may be substituted by a flexible joint. A preferred type of joint will be hereinafter described.

The branch line 41 possessing several sub-branches, each extending to a respective bearing of the radius bar, as for instance: sub-branch 43 leads to one of the bearings for shackle; 44, a sub-branch leading to an opposite bearing for the shackle; and 45, to the bearings at the upper end of the radius bar to which a link is connected. Each of the sub-branches 43, 44, 45, has its own regulating valve 2 interposed therein for regulating the supply of lubricant, which is required for the bearing which it serves.

A second main feed line 46 (see Figures 13 and 14) extends from the lubricator along one of the stationary side frames to which it is anchored, and provided with a plurality of branches, has a branch 47 leading to a stationary bearing on the frame 30 for serving the fulcrum of the bell crank lever 35 with a regulating valve 2 interposed in the line for regulating the lubricant feed to said bearing.

A sub-branch 48 connects with the branch 47, and through a flexible tube or joint, leads to and connects with a movable bearing of the bell crank lever 35. The main feed line 46 also carries a flexible connection to extend to the lever 33 from whence it branches for lubricating various points on said lever movable with the lever and as illustrated constitutes a branch 49 extending to the movable bearing at the lower end of said lever to which a link connection is made, and a branch 50 upon the lever to a bearing joining the lever to the shackle 32. A regulating valve is interposed in the line to serve the branches.

In Figures 15 to 18 inclusive, piping arrangements are shown for distributing the lubricant to the upper and lower stationary guides for the engine cross head.

In Figure 15 a branch line 51 extends from a manifold 52 mounted on the upper guide to a distributing point of the upper guide and a second branch line 51 from the manifold to a distributing point of the lower guide. In Figure 16, the branch lines are multiplied, i. e., four feed lines extend from the manifold. The manifold is of a type as illustrated in Figures 6 and 7, containing a check valve for the unit and regulating valves for each branch. The guides may be bored as illustrated in Figure 17 for distributing the lubricant to the opposite sides and lower surfaces of the guide.

In Figures 11 and 12 a preferred arrangement is disclosed for lubricating various points of a valve stem guide 37, a combination lever 53, and a union link 54, which connects the combination lever 53 with the cross head. These parts possess moving bearings and journals, difficult to supply having severe and extended motion making it necessary to interpose a flexible joint in making the jump from a stationary to a relatively movable point, it having been experienced that flexible tubing is inefficient and unreliable. The motion and vibration is very severe so that the life of a flexible tube is readily destroyed causing a break and leakage in the line.

In Figures 19 to 24 a preferred type of conduit flexible joint 55 is illustrated and incorporated in several different types of fittings as for instance, one element of the joint may be provided with means for rigidly securing the same to a stationary support or it may serve as a manifold for making branch connections all directed toward reducing the number of fittings and pipe connections to simplify installation, thereby minimumizing the possibilities for leakage. In general, the flexible joint as shown in Figure 19 constitutes a hollow body with provision for making a pipe or line connection and may be either movable or stationary, being movable when the body line connection is made from one movable point to a second movable point, or it may be stationary when the service is from a stationary to a movable point.

The body 56 is counterbored to provide a cylindrical chamber 57, closed at one end by a cap 58 screw-threaded into the body. A pipe connecting tubular stem 59 is journalled within the body and cap and has an annular head or flange 60 intermediate thereof within the chamber 56, providing a shoulder compressed against a packing 61 about the shank or stem 59, between the shoulder and end wall of the chamber, by a spring between the flange 60 and inner end of the cap 58. The free or rear end of the stem rotating within the cap is squared or surfaced for a wrench hold. The stem 59 is rotatable within the cylindrical body, or the body and stem can swivel one upon the other and the parts constantly under compression axially to prevent leakage through journal and to accommodate for wear. The stem is angle bored to provide a conduit constantly open to the chamber 57 and through the joint.

In Figures 20 and 21 the body is provided with a base or bracket 63 for rigidly mounting the body and also with hubs 64 for making manifold connections.

In Figures 22–24 the body is shown as provided with an extension bored to serve as a manifold, and each outlet thereof having its own regulating valve 65 for individual branch line regulation.

In Figures 11 and 12 a preferred arrangement of piping or lubricating distributing lines are disclosed for lubricating various points of the valve stem guide 37, combination lever 53, and union link 54, each connects the combination lever 53 to the cross head, these parts having movable bearings and journals, difficult to supply and moving under heavy and extended motion. It has been experienced that the use of flexible tubing in making a jump from a stationary to a relatively movable joint, or from one movable joint to a second movable joint, cannot be efficiently and reliably employed. The motion and vibration is too severe for the tubing so that its life is soon destroyed causing it to leak or break.

The main line 66 extending from the lubricator is provided with a pair of branches 67 respectively leading to the opposite guides 68—68 of the valve stem guide 37 for lubricating the slides of the combination lever 53. Each of said branches 67 has a regulating valve 2 interposed therein. A third branch 69 of the main line extends upwardly and connects with the body of a flexible joint 55 secured to a stationary support from which it continues through the swivel stem of the joint 55 to the link connecting the combination lever with the bell crank lever. In the portion of the branch line between the flexible joint and the point of connection with the link, two flexible joints are interposed, both having their members free to swivel one upon the other and may be referred to as a double flexible joint to distinguish it from the type in which the body of the joint is stationary.

A fourth branch line 70 connects with the main supply line 66 having several flexible joints 55 interposed therein to carry the line from a stationary joint of the valve stem guide 57 to the combination lever and from the combination lever 53 to the union link as from a movable member to a second movable member. The flexible joint 55 which has its body mounted upon the union link is of the manifold type to provide for several sub-branch lines as 72, 73, one leading to a stationary joint as a journal of the end of the link, and a second to a movable joint as the cross head pin, so that in the sub-branch line 73, a flexible joint is interposed as the connection is from relatively fixed to a movable point. In the branch line 70 one of the flexible joints in advance of the sub-branch connections can be of the regulating valve type so that the sub-branch has its own regulating control. The manifold and regulating valve type of flexible joint is also provided for the sub-branch lines carried by the union link. This type of lubricating means may be extended to the main and side rods for oiling the main pin and side rod bearings (not shown).

The piping wherever possible is firmly anchored, either by screws engaged through the brackets of the fittings or by cleats or U-bolts straddling a part as shown in Figures 11 and 12 for rigidly mounting the conductors upon the combination lever 53 and union link 54.

The best example of distribution unit with all phases is illustrated in Figure 11 in which the main feed line 66 has certain branches leading to stationary parts, others from a stationary to a movable part and from a movable to a second movable part requiring the interposition of one or several flexible or hinge joints and a combined hinge joint and manifold with a regulating valve for each manifold outlet, thus centralizing the branch line take offs from the main line.

Having described my invention, I claim:

1. A force feed lubricating system for supplying lubricant for a plurality of bearings requiring the delivery of lubricant at relatively different pressures, comprising, a lubricator including means for forcibly delivering the lubricant therefrom, a single feed line extending from the lubricator to a point in proximity to the various bearings of a group to be lubricated, a pressure responsive valve at approximately the terminal of said single feed line for governing and controlling the supply to a maximum pressure necessitated for the bearing of the group requiring the highest delivery pressure, a plurality of branch lines, one respectively for each bearing of the group in distributing connection with said pressure responsive valve, and a valve respectively one for each branch line for a relative regulation of the lubricant distribution to maintain a supply pressure for the bearing requiring the highest delivery pressure.

2. A force feed lubricating system for supplying lubricant for a plurality of bearings requiring the delivery of lubricant at relatively different pressures, comprising, a lubricator including means for forcibly delivering the lubricant therefrom, a single feed line extending from the lubricator to a point in proximity to the various bearings of a group to be lubricated, a pressure responsive valve toward the terminal of said single feed line for governing and controlling the supply to a maximum pressure necessitated for a bearing of the group requiring the highest pressure delivery, a distributor, a plurality of branch lines, one respectively for each bearing of the group leading from said distributor, and a valve respectively for each branch line for a relative regulation of the lubricant distribution to maintain a supply pressure for the bearing requiring the highest delivery pressure.

3. A force feed lubricating system for supplying lubricant for a plurality of bearings requiring the delivery of lubricant at relatively different pressures, comprising, a lubricator including means for forcibly delivering the lubricant therefrom, a distributor, a single feed line leading from the lubricator to the distributor, a pressure responsive valve interposed in the feed line in advance of the distributor for governing and controlling the supply to a maximum pressure necessitated for the bearing of the group requiring the highest delivering pressure, a plurality of branch lines, one respectively for each bearing of the group respectively connecting with said distributor, and a valve respectively for each branch line for a relative regulation of the lubricant delivery therefrom to maintain a supply pressure for the bearing requiring the highest delivery pressure.

ELMER O. COREY.